June 10, 1969 M. H. DAVIS 3,448,818

VEHICLE CONTROL APPARATUS

Filed April 7, 1967 Sheet 1 of 4

INVENTOR.
MARION H. DAVIS
BY
Woodard, Weikart, Emhardt & Naughton
Attorneys

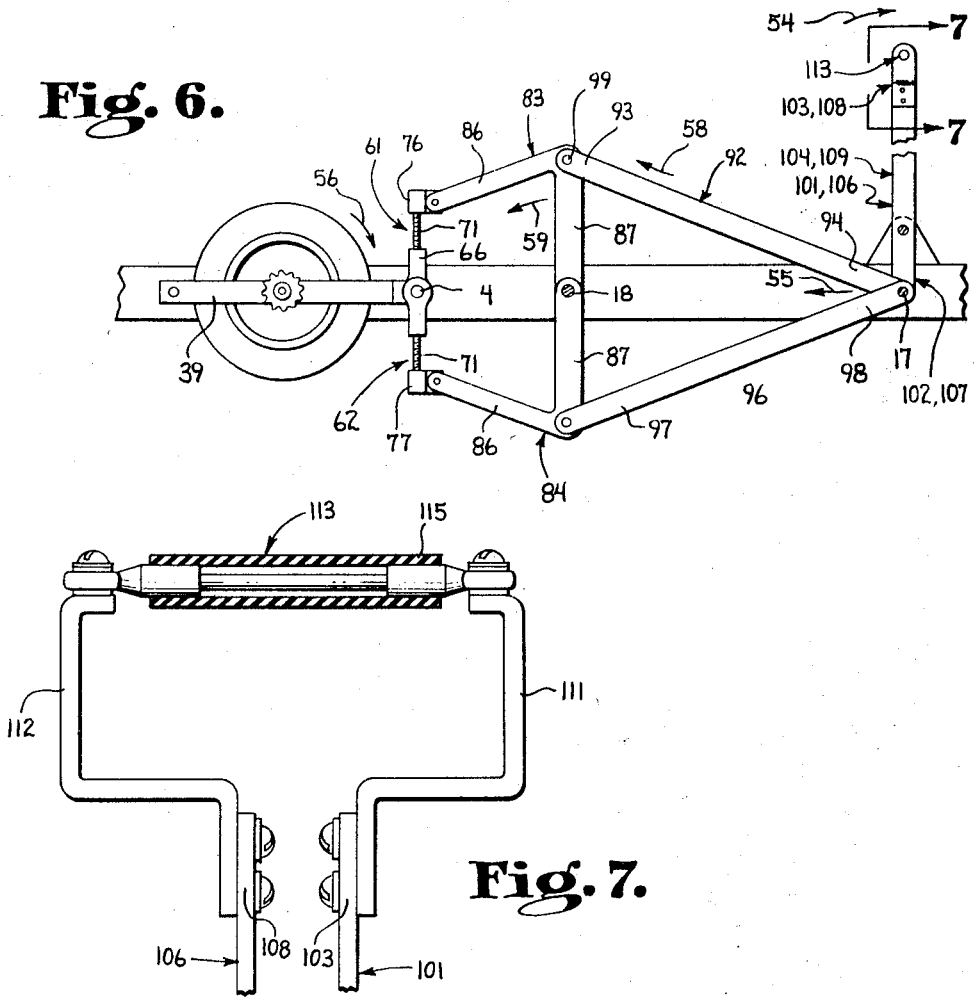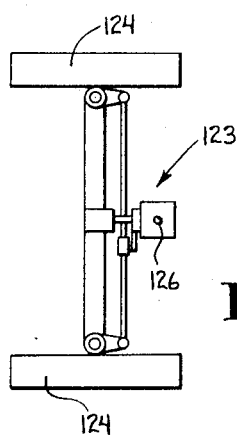

INVENTOR.
MARION H. DAVIS
BY
Woodard, Weikart, Emhardt & Naughton
Attorneys

United States Patent Office 3,448,818
Patented June 10, 1969

3,448,818
VEHICLE CONTROL APPARATUS
Marion H. Davis, Hagerstown, Ind., assignor to V-Plex Clutch Corporation, Hagerstown, Ind., a corporation of Delaware
Filed Apr. 7, 1967, Ser. No. 629,306
Int. Cl. B62d 5/02, 11/10
U.S. Cl. 180—6.66                   8 Claims

ABSTRACT OF THE DISCLOSURE

Control means having a linkage for transmitting motion from a manually operated handle to a variable speed reversible drive unit to control the speed and direction of rotation of an output shaft.

BACKGROUND OF THE INVENTION

Field of the invention

The present invention relates to the fields of rotational shaft control, vehicle speed and direction control and control of combined clutch and transmission devices.

Description of the prior art

Many and varied control devices are known in the art for the control of conventional rotational shaft power transmission units. In vehicles, for example, the clutch and gear shift are well known, as is the stick control for tracked vehicles. There is a continuous effort to obtain better control means—control means that are easier to use, simpler, more rugged, easier to repair, and better in every way. This effort extends not only to control means for traditional and well-known drive units, such as those noted above, but also includes control means for new and improved drive means, such as that disclosed in my Patent No. 3,306,132 issued Feb. 28, 1967. There has long been a quest for a rugged, simple, easy to use and easy to repair control for vehicles that combines control of speed, direction, and steering. Combined controls have been devised which are very expensive and complex, such as those placed in some experimental automobiles, and which require many servomechanisms and auxiliary devices. The present invention fills this need by providing a control means meeting requirements set forth above.

SUMMARY OF THE INVENTION

One embodiment of the present invention includes two levers, a linkage, and a drive unit, all mounted on a vehicle. The drive unit, as fully described in my aforementioned patent, includes a first frame having a powered shaft mounted thereon for rotation. First and second generally conical drive members are secured to the powered shaft in spaced relationship to each other and with their conical surfaces facing away from each other.

Two cradle frames are pivotally mounted to the first frame and each of the cradle frames has a driven member mounted for rotation thereon. Each of the driven members has an internal generally conical surface in closely spaced facing relationship to portions of the generally conical friction surfaces of the first and second drive members.

Operating levers, push rods, cranks and adjustable links are operatively interconnected to rock the cradle frames about their pivotal mountings, thereby engaging the driven members of the drive unit with one or the other of the generally conical drive members and varying the point of contact therebetween in a manner which varies the ratio between the output and input speeds, providing reversible variable speed outputs with a unidirectional constant speed input.

It is therefore an object of the present invention to provide new vehicle control means.

It is a further object to provide an improved control for a reversible variable-speed drive unit.

Another object is to provide a control that is rugged and comparatively simple in construction.

A still further object is to provide a control that combines, in a single operating lever, control over the direction of rotation and speed of an output shaft.

Yet another object of the present invention is to provide a control for a vehicle whereby speed, forward and reverse, and turning are controllable by manipulation of a single handle.

A still further object is to provide a control whereby two output shafts of a drive unit may be made to run separately or simultaneously, in the same or opposite directions of rotation, and at the same or different speeds of rotation, by the manipulation of a single control handle.

Another object is to provide control means achieving the foregoing objects and which is durable in operation, easily operated and easily repaired.

Brief description of the drawings

The full nature of the invention will be understood from the accompanying drawings and the following description and appended claims.

FIG. 6 is a side view of one embodiment of the invention taken generally along the line 6—6 of FIG. 1.

FIG. 7 is a detail view of one embodiment of the control handle taken along the line 7—7 of FIG. 6.

FIG. 8 is a schematic plan view of an embodiment of the invention utilizing a conventional front wheel steering mechanism.

DESCRIPTION OF THE PREFERRED EMBODIMENTS

Figure 1:
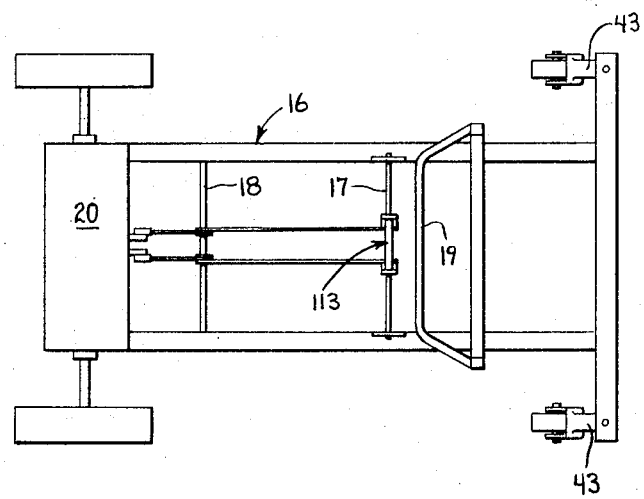
FIG. 1 is a schematic plan view of the control apparatus mounted on a vehicle.

Referring now to the drawings in detail, there is a primary frame 16 which may be the chassis of a vehicle, as shown in FIG. 1. Affixed to the primary frame 16 are the drive unit 20, the operating lever axle 17, the bell crank lever axle 18 and the stabilizing bar 19, the structure and operation of which will be subsequently described in detail.

Figure 2:
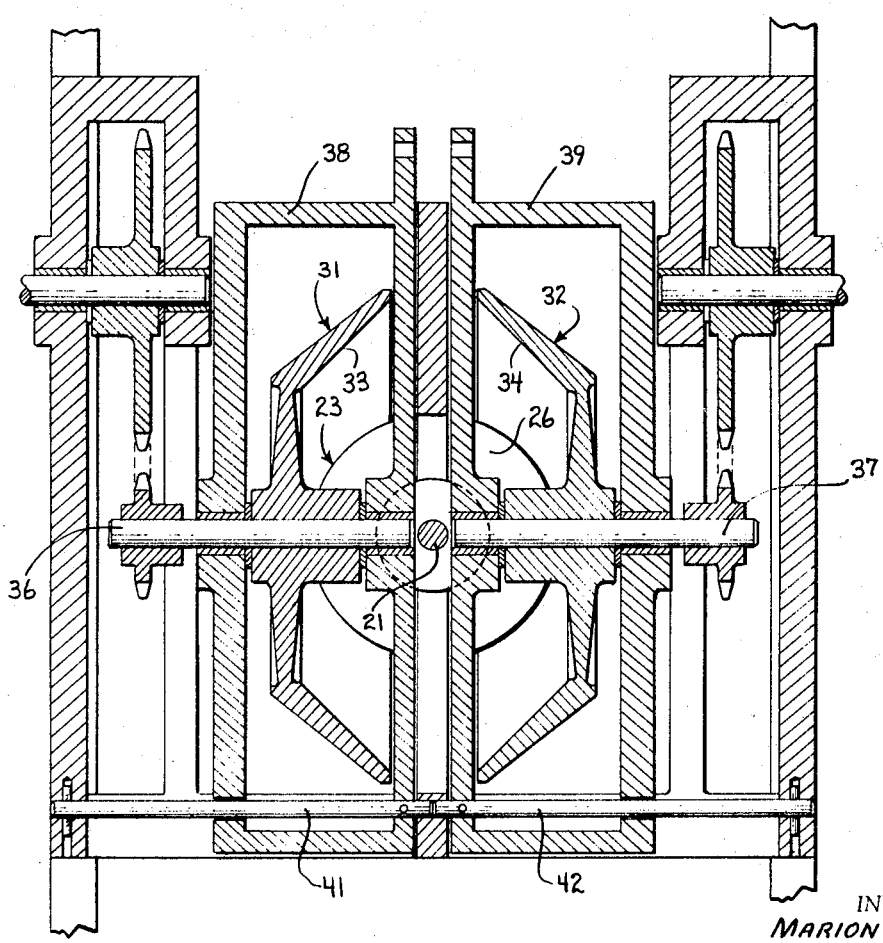
FIG. 2 is an enlarged cross sectional view of the drive unit looking downward.
Figure 3:
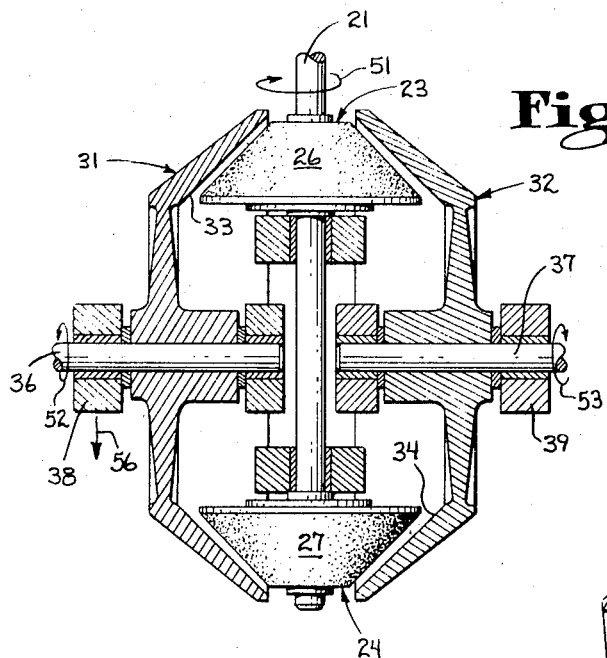
FIG. 3 is an enlarged cross sectional view of a portion of the drive unit taken along the line 3—3 of FIG. 1 and showing the drive in the neutral position.

To fully understand the operation of the present invention, it is necessary to understand the operation of one of the drive units with which it is intended to be used. One particular drive unit with which the present invention is intended to be used is explained fully in my aforementioned patent, and includes a powered shaft 21, two generally conical drive members 23 and 24 secured thereto with their respective conical friction surfaces 26 and 27 facing away from each other as best shown in FIGS. 2 and 3. First and second driven members 31 and 32 are rotatably mounted upon first and second output shafts 36 and 37 which are journaled in first and second cradle frames 38 and 39 respectively. The driven member 31 has a contact surface 33 and the driven member 32 has a contact surface 34. The driven member 31 is so oriented that its contact surface 33 is in closely spaced relationship to both friction surfaces 26 and 27, and such that a small rocking of the cradle frame 38 about its pivotal axis 41 in one direction will bring the contact surface 33 into contact with the friction surface 26, and a small rocking of the cradle frame 38 in the other direction will bring the contact surface 33 into contact with the friction surface 27. Likewise is the contact surface 34 brought into contact with the friction surfaces 26 and 27 by rocking the cradle frame 39 about its pivotal axis 42.

It will readily be appreciated by reference to FIG. 3 that with the drive members 23 and 24 rotating in the direction of the arrow 51, when the contact surface 33 is in contact with the friction surfaces 26, the output shaft 36 will be rotated in the direction of the arrow 52, and when in contact with the friction surface 27 will be rotated in a direction opposite the arrow 52. Likewise, when the contact surface 34 is in contact with the friction surface 27, the output shaft 37 will be rotated in the direction of the arrow 53 and when in contact with the friction surface 26 will be rotated in a direction opposite the arrow 53.

From the foregoing, it is apparent that when the contact surfaces 33 and 34 are in the neutral position, that is, in contact with neither of the friction surfaces 26 or 27, no rotation is imparted to the output shafts 36 and 37. It will further be apparent that without changing the direction of rotation of the powered input shaft 21, rotation in either direction may be imparted to the output shafts 36 and 37 merely by pivoting the cradle frames 38 and 39 about their respective pivotal axes.

Figure 5:
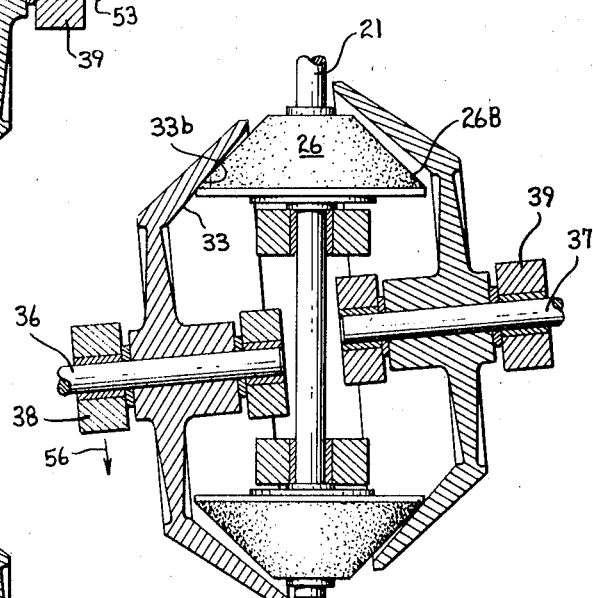
FIG. 5 is also similar to the view of FIG. 3 and shows the drive unit in the minimum speed ratio (maximum output speed) position.
Figure 4:
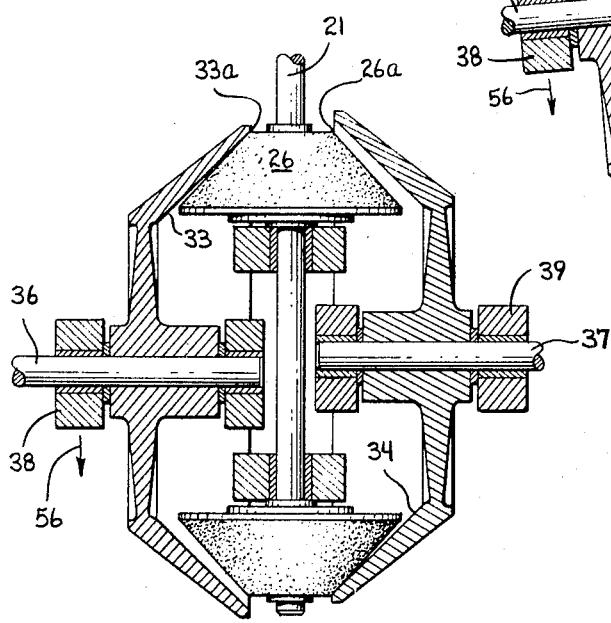
FIG. 4 is similar to the view of FIG. 3 and shows the drive unit in the forward maximum speed ratio (minimum output speed) position.

A more subtle feature of this particular drive unit with which the control means of the present invention can be used is that of providing a variable speed ratio between the powered shaft 21 and each of the output shafts 36 and 37. As fully explained in my patent, the drive unit 20 provides for variation of the point of contact between the friction surfaces 26 and 27 and the contact surfaces 33 and 34. For example, as the cradle frame 38 is pivoted about its pivotal axis 41 in the direction of the arrow 56, the outer periphery 33a of the contact surface 33 contacts the point of least diameter 26a on the conical friction surface 26. In this position is provided the highest speed ratio between the input shaft 21 and the output shaft 36, and consequently the maximum available torque to the output shaft 36. As the cradle frame 38 is further pivoted in the direction of the arrow 56, the contact point between the contact surface 33 and the friction surface 26 moves radially with respect to both said surfaces until the member assumes the position shown exaggerated in FIG. 5. When the point of contact between the contact surface 33 and the friction surface 26 is between the largest diameter of the friction surface 26, indicated at 26b, and the smallest diameter of the contact surface 33, indicated at 33b, the output shaft 36 is rotated at the maximum speed and the available multiplication of torque is at a minimum. Operation of the output shaft 37 upon pivoting the cradle frame 39 about its pivotal axis 42 is identical to the above-described operation of the output shaft 36, with the exception that the directions of rotation are reversed, as will be apparent upon inspection of FIGS. 3, 4 and 5.

It can be seen from the above explanation of the operation of the drive unit 20, that control is accomplished by rocking the cradle frames 38 and 39 about their pivotal axes 41 and 42.

With particular reference to FIG. 6, there is an adjustable link 61 pivotally connected to the cradle frame 38 by means of a bolt (not shown) and an adjustable link 62 pivotally connected to the cradle frame 39 by means of a bolt 64. The adjustable link 61 is oriented substantially perpendicular to the plane of the cradle frame 38 and extends upwardly. The adjustable link 62 is oriented substantially perpendicular to the plane of the cradle frame 39 and extends downwardly.

The adjustable links 61 and 62 include a first member 66 having an eye to accommodate a bearing bushing, and an internally threaded shank, which receives a threaded rod 71. A nut on the threaded rod 71 may be used to lock the threaded rod 71 to the first member 66. Rod end connecting blocks 76 and 77 are fastened to each of adjustable links 61 and 62 by the threaded rods 71.

The rod end connecting blocks 76 and 77, as best shown in FIG. 6, may be provided with suitable threaded holes for receiving the threaded rods 71 or may be provided with smooth bore holes and the rods 71 secured thereto by a pair of nuts.

Pivotally connected to the rod end connecting blocks 76 and 77 are bell crank levers 83 and 84 respectively. Each of the bell crank levers 83 and 84 includes a first member 86 and a second member 87. One end of the first member 86 overlaps and is rigidly affixed to one end of the second member 87, preferably by welding to provide a generally V-shaped structure. Also, the members 86 and 87 may be integral. The other end of the first member 86 of the bell crank lever 83 is pivotally connected to the rod end connecting block 76, as mentioned above. The other end of the first member 86 of the bell crank lever 84 is similarly pivotally connected to the rod end connecting block 77.

The other end of the second outboard 87 is pivotally connected to the bell crank lever axle 18 by suitable bearing bushings. It should be noted that the bell crank lever 84 is identical to the bell crank lever 83 with the exception that the former, as shown in FIG. 6, is positioned under the bell crank axle 18, while the latter is positioned over the bell crank axle 18. The bell crank axle 18 is fastened at each of its ends and to the frame 16, as mentioned above.

A connecting rod 92 having a first end 93 and a second end 94 is pivotally connected to the bell crank lever 83 at its first end 93 by a pin 99. Similarly, a connecting rod 96 is pivotally connected at its first end 97 to the bell crank lever 84 by a pin 99. The connecting rod 92 extends rightwardly and downwardly, and the connecting rod 96 extends rightwardly and upwardly, as viewed in FIG. 6.

Two operating levers 101 and 106 each have first ends 102 and 107, second ends 103 and 108, and intermediate portions 104 and 109 respectively. The operating levers 101 and 106 are pivotally connected to the operating lever axle 17 at a point nearer the first ends 102 and 107 than the second ends 103 and 108, and are substantially vertical. The first end 102 of the operating lever 101 is pivotally connected to the second end 94 of the connecting rod 92. The first end 107 of the operating lever 106 similarly connected to the second end 98 of the connecting rod 96. The second end 103 of the operating lever 101 and the second end 108 of the operating lever 106 are provided with hand portion receivers and are manually operable to control the drive unit 20.

In operation, the operating lever 101 controls the output shaft 36 and the operating lever 106 controls the output shaft 37. With reference to FIG. 6, when the second end 103 of the operating lever 101 is moved in the direction of the arrow 54, the first end 102 moves in the direction of the arrow 55. This motion moves the connecting rod 92 in the direction of the arrow 58, resulting in a pivotal motion of the bell crank lever 83 as indicated by the arrow 59. Because the first member 86 of the bell crank lever 83 is rigidly connected to the second member 87, the pivotal motion of the bell crank lever 83 causes the adjustable link 61 to be moved generally downwardly. This motion, in turn, acting upon the pivotal connection between the cradle frame 38 and the adjustable link 61 rotates the cradle frame 38 about its pivotal axis 41 in the direction of the arrow 56 as shown in FIG. 3, thereby causing the contact surface 33 to come in contact with the friction surface 26. With the powered input shaft 21 rotating in the direction of the arrow 51, the output shaft 36 will be rotated in the direction of the arrow 52. As described earlier, further movement of the operating lever 101 in the direction of the arrow 54 will cause the contact point between the contact surface 33 and the friction surface 26 to move radially, thereby varying the speed ratio between the output shaft 36 and the powered shaft 21.

It will be readily seen that movement of the operating lever 101 in the direction opposite that of the arrow 54 will reverse the motions above described, and will cause the contact surface 33 to come in contact with the friction surface 27, thereby imparting rotation to the output shaft 36 in the direction opposite that indicated by the arrow 52. Also, further motion of the operating lever 101 opposite the direction of the arrow 52 will similarly cause a radial movement of the contact point between the contact surface 33 and the friction surface 27, thereby varying the speed ratio between the output shaft 36 and the powered input shaft 21.

Operation of the output shaft 37 by means of the operating lever 106 is substantially identical to the above described operation of the output shaft 36, with the exception that the cradle frame 39 is moved upwardly rather than downwardly when the operating lever 106 is moved in the direction of the arrow 52. This reversal of direction is accomplished by pivoting the bell crank lever 84 below, rather than above the bell crank axle 18, and is necessary to accomplish the desired directions of rotation of the output shaft 37 with respect to the operating lever 106 because of the basic nature of the drive unit. It will be appreciated that the above described control means provides for rotation of both output shafts 36 and 37 in the same direction when the operating levers 101 and 106 are moved in the same direction. This feature is especially desirable when the present invention is used on a vehicle, such as a lawn mower, and eliminates the necessity of using a reversing gear coupled to one of the output shafts to provide wheel rotation in the same direction in response to movement of both operating levers in the same direction.

Another embodiment of the present invention is shown in FIG. 7 wherein handle brackets 111 and 112 are connected to the second ends 103 and 108 of the control levers 101 and 106 respectively, and a hand portion receiver in the form of a control handle 113 is connected between the said brackets. The connection between each of the brackets 111 and 112 and the operating levers, 101 and 106 respectively, is rigid and made preferably with machine screws. The connection between the control handle 113 and the control brackets 111 and 112 is pivotal in nature and is shown in detail in FIG. 7. A section of rubber hose or other suitable material 115 may be placed over the operating handle 113 for convenience of the operator.

This embodiment of the present invention provides one-handed operation of the drive unit by permitting the operator to control both output shafts 36 and 37 by simple movements of the control handle 113. If the handle is rotated about a vertical line passing through its center, one operating lever, such as lever 101, will be moved in the direction of the arrow 54, and simultaneously, the other operating lever 106 will be moved in the direction opposite the arrow 54. Reversal of the direction of rotation of the operating handle will, obviously, reverse the directions in which the operating levers 101 and 106 are moved. Additionally, a movement of the operating handle in the same or opposite direction of the arrow 54, and without it being rotated, will result in the operating levers being moved in the same direction. It will be obvious to one skilled in the art that this embodiment of the present invention provides complete control over all possible operations of the drive unit in a single handle. Depending only upon the positioning of the control handle 113, that is, by moving it in the direction of or against the arrow 54 and simultaneously rotating it about a substantially vertical axis intersecting the operating lever axis 17, any combination of operations may be produced. That is, the output shaft 36 may be rotated in either direction, and at any speed within the capability of the drive unit, while simultaneously the output shaft 37 may be driven at another speed and in the same or opposite directions.

Both of the above described embodiments of the present invention have been found very desirable for use in vehicles, such as golf carts and lawn mowers. When so used, the rear wheels of the vehicle are driven by output shafts 36 and 37. In place of the conventional steering devices used on such vehicles, the front wheels are mounted on casters 43 without any steering means connected thereto as shown in FIG. 1. Steering is accomplished by varying the rotation of the two output shafts 36 and 37, and as a result, the rotation of the two rear wheels of the vehicle. Steering is easily accomplished and because one rear wheel can be rotated forwardly and the other simultaneously rotated rearwardly, a vehicle provided with the above described drive unit and control apparatus has an extremely short turning radius.

For example, to move the vehicle of FIG. 1 forward, the control handle 113 is moved forward without being rotated. To increase the forward speed, the control handle is moved farther forward. To turn to the right, the control handle is rotated clockwise looking downward while at the same time being held forward. The greater the degree of handle rotation, the sharper the turning angle of the vehicle. The control handle 113 may be rotated so that the left wheel continues to rotate forwardly and the right wheel rotates rearwardly. In this position, the vehicle can be made to turn in a very small area. To turn left, the control handle is rotated counterclockwise looking downwardly as in FIG. 1. Small counterclockwise rotation of the control handle 113 while it is being held forward will cause the vehicle to turn slightly to the left. Further rotation will cause sharper turning. Merely rotating the control handle 113 without moving it forward or backward will cause the vehicle to pivot about a vertical axis substantially midway between the two drive wheels. This is because such movement of the control handle causes one wheel to rotate forward and the other to rotate backward at the same speed.

Similarly, rearward motion is accomplished by moving the control handle 113 rearwardly. Straight rearward motion of the control handle without rotation will cause the vehicle to back straight, whereas, rearward motion of the control handle 113 and simultaneous rotation of the control handle 113 will cause the vehicle to turn as it is backing.

Figure 9:
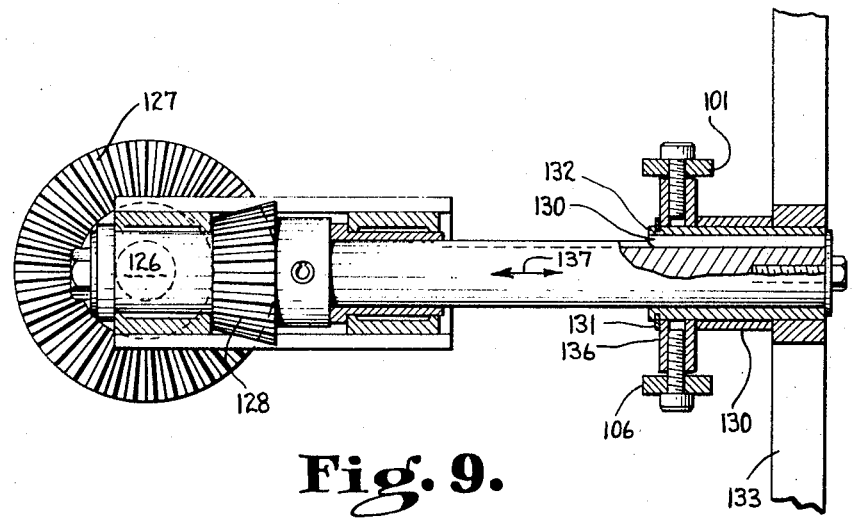
FIG. 9 is an enlarged cross sectional view of a portion of a steering column adapted for use with the FIG. 8 embodiment of the present invention.

FIG. 9 shows another embodiment of the present invention, wherein the control apparatus includes and is adapted to function with a conventional front wheel steering mechanism. A conventional steering mechanism 123 (shown schematically in FIG. 8) is used to steer the front wheels 124. The conventional steering mechanism 123 is operated by the shaft 126, which extends upwardly to the bevel gear 127. The bevel gear 128 engages the bevel gear 127, so that rotation of the shaft 129 will rotate the shaft 126, thereby operating the steering mechanism 123 of the front wheels.

A hand portion received in the form of a steering wheel 133 and having a hub portion 132 is rotatably fixed and axially slidable with the shaft 129 by means of a key 130. A control collar 136 is axially fixed and rotatably slidable upon the steering wheel hub 132, said collar being held in place by a spacer 130 and a retaining ring 131. The operating levers 101 and 106 are pivotally connected at their second ends 103 and 108 respectively to opposite sides of the control collar 136.

In operation, this embodiment of the control apparatus provides for conventional operation of the front wheel steering mechanism 123, but allows the steering wheel 133 to be moved axially, imparting motion to the control collar 136. This motion moves the operating levers 101 and 106 simultaneously in the direction of the arrow 137. Because both control levers are connected to the control collar 136, they cannot be moved in opposite directions at the same time. This restriction limits the operation of the drive unit so that both output shafts 36 and 37 turn in the same direction with respect to each other, but preserves the variable speed ratio and reversing features of the heretofore described embodiments. Therefore, forward, reverse, and variable speed are achieved by moving the steering wheel axially toward the front and rear, respectively, the extent of movement determining the speed ratio. Turning is accomplished in the usual manner by turning the steering wheel.

In the embodiments of the invention above described, it has been found desirable to provide a hand stabilizer, such as the stabilizing bar 19, as best shown in FIG. 1, whereupon the operator may rest and brace his hands when operating the control apparatus. The stabilizing bar 19 is affixed to the frame 16 and provides a reference point which is fixed relative to the frame 16 so that when the vehicle runs over irregularities in the terrain, any lurching motion imparted to the operator will not be transmitted to the control levers.

Figure 10:
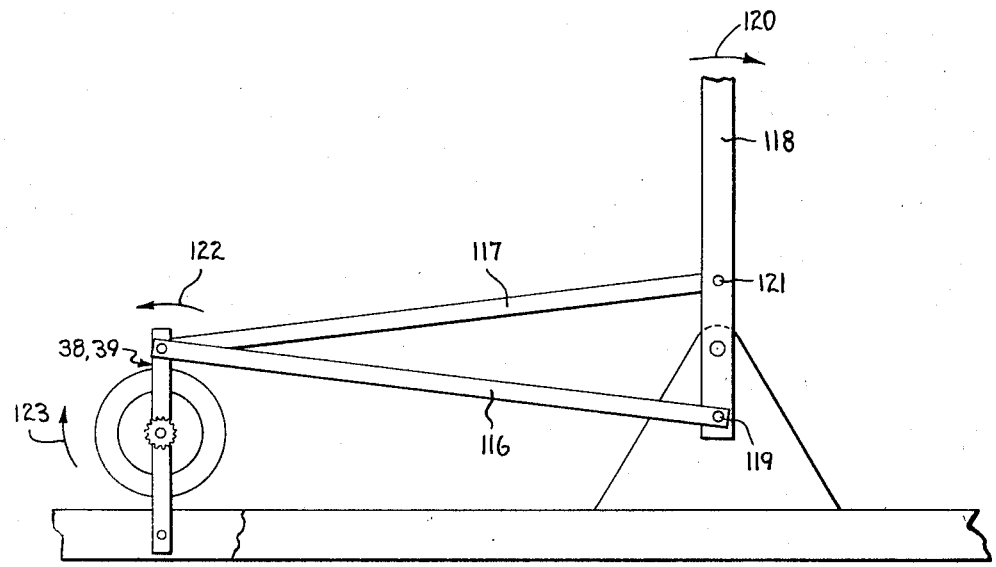
FIG. 10 is a partial diagrammatic side elevation of still another embodiment of the invention.

FIG. 10 shows still another embodiment of the present invention which employs a linkage somewhat simpler than that described above. In this embodiment, the cradle frame 38 is pivotally connected to one end of a connecting rod 116, which is substantially perpendicular to the cradle frame 38. The cradle frame 39 is pivotally connected to one end of a connecting rod 117, which is also substantially perpendicular to the cradle frame 39. The connecting rod 116 is pivotally connected at its other end to an operating lever 118 at a point 119. The connecting rod 117 is pivotally connected at its second end to the intermediate portion of the operating lever 118, at a point 121 which is the same distance above the operating lever axle as the point 119 is below the operating lever axle. It will be readily apparent that movement of the operating lever 118 in the direction of the arrow 120 will move the connecting rod 117 rightwardly and the connecting rod 116 leftwardly, as viewed in FIG. 10. This motion will rock the cradle frame 38 in the direction of the arrow 122 and the cradle frame 39 in the direction opposite the arrow, thereby causing the output shafts 36 and 37 to rotate in the direction of the arrow 123. Reversing the above described motion will reverse the direction of rotation of the output shafts 36 and 37. This configuration retains the variable speed ratio feature of the first described embodiments, but is incapable of rotating the output shafts simultaneously in opposite directions or simultaneously at different rotational speeds.

It is believed that from the foregoing description, it will be apparent that the present invention provides an excellent control means for various mechanisms including the particular type of drive unit described above. It provides an improved control for the reversible variable speed drive unit, and is rugged and comparatively simple in construction. It further combines in a single operating lever control over the speed and direction of rotation of an output shaft and combines, in a single operating handle, control over two such shafts, and when used in a vehicle, provides single handle control over direction of travel, speed, and turning.

From the foregoing, it is apparent that variations may be made within the scope of the present invention and which would not have the same construction as that shown and described herein. For example, in a drive unit having only one output shaft, only one operating lever, connecting rod, bell crank and adjustable link may be used to control the output shaft. Also, the present invention may easily be adapted to stationary use as well as vehicular use. Therefore, while the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. Control apparatus comprising a primary frame; a drive unit mounted to said primary frame and having a power input shaft and a first power output shaft; a first shiftable member within said drive unit shiftable between first positions providing various speeds of forward rotation of said first output shaft, and second positions providing various speeds of reverse rotation of said first output shaft; operating lever means pivotally connected to said primary frame to pivot about a first axis; and linkage means coupling said operating lever means to said first shiftable member; a hand portion receiver coupled to said operating lever means for pivoting said operating lever means about said first axis to shift said first shiftable member and thereby control the speed and direction of rotation of said first output shaft; and an elongated hand stabilizer extending generally parallel to said first axis and affixed to said primary frame and being immediately adjacent said hand portion receiver to enable a person to steady his hand upon said stabilizer while manipulating said receiver with said hand to control said first output shaft.

2. Vehicle control apparatus comprising:

a primary frame;

a reversible variable speed drive unit mounted to said primary frame, said drive unit having a power input shaft and two power output shafts, each of said output shafts being coupled to a drive wheel of said vehicle for propelling said vehicle;

operating lever means pivotally connected to said primary frame to pivot about a first axis and coupled through linkage means to said drive unit;

a hand portion receiver coupled to said operating lever means for manually controlling speed, forward and reverse, and turning of said vehicle;

said operating lever means including two levers in spaced apart relationship, each of said two levers controlling the speed and direction of rotation of one of said two power output shafts, said hand portion receiver including an elongated bar pivotally mounted adjacent its opposite ends to said two levers, said bar being bidirectionally pivotal about said first axis to urge said two levers in the same direction and being pivotal bidirectionally about second axis intersecting said first axis intermediate of said two levers to urge said two levers in opposite directions.

3. The control apparatus of claim 2 further comprising a hand stabilizer affixed to said primary frame and being adjacent said elongated bar to enable a person to steady his hand upon said stabilizer while manipulating said bar to control said vehicle.

4. Control apparatus comprising: a primary frame; a drive unit mounted to said primary frame and having a power input shaft and a first power output shaft; a first shiftable member within said drive unit shiftable between first positions providing various speeds of forward rotation of said first output shaft, and second positions providing various speeds of reverse rotation of said first output shaft; operating lever means pivotally connected to said primary frame to pivot about a first axis; and linkage means coupling said operating lever means to said first shiftable member, said linkage means including a first adjustable link having its one end pivotally connected to said first shiftable member, a first bell crank lever mounted to said primary frame for pivoting about one side of a bell crank lever axis parallel to and spaced away from said first axis, said first adjustable link having its other end pivotally connected to said first bell crank lever, a first connecting rod having a generally elongated shape and having a first end and a second end, said first connecting rod being pivotally connected at said first end to said first bell crank lever and being pivotally connected at said second end of said operating lever means, said operating lever means being pivotable about said first axis to shift said first shiftable member and thereby control the speed and direction of rotation of said first output shaft.

5. The control apparatus of claim 4 wherein said linkage means includes a second adjustable link pivotally connected to said second shiftable member;

a second bell crank lever mounted to said primary frame for pivoting about the other side of said bell crank lever axis;

said second adjustable link being pivotally connected to said second bell crank lever, a second connecting rod having a generally elongated shape and having a first end and a second end, said second connecting rod being pivotally connected at said first end to said first bell crank lever and being pivotally connected at said second end to said operating lever means, said operating lever means being pivotable about said first axis to shift said first and second shiftable members and thereby control the speed and direction of rotation of said first and second output shafts.

6. The control apparatus of claim 5 wherein said operating lever means includes a first lever and a second lever being in spaced apart relationship;

each said lever having a first end and a second end;

said first end of said first lever being connected to said second end of said first connecting rod; and said first end of said second lever being connected to said second end of said second connecting rod.

7. The control apparatus of claim 6 further comprising a hand portion receiver including an elongated bar pivotally mounted adjacent its opposite ends to the second ends of said first and second levers, said bar being bidirectionally pivotal about said first axis to urge said first and second levers in the same direction and being pivotal bidirectionally about second axis generaly perpendicular to and intersecting said first axis intermediate of said first and second levers to urge said first and second levers in opposite directions.

8. The control apparatus of claim 7 further comprising a hand stabilizer affixed to said primary frame and being adjacent said elongated bar to enable a person to steady his hand upon said stabilizer while manipulating said bar with the same hand to control said first and second output shafts.

References Cited

UNITED STATES PATENTS

| | | | |
|---|---|---|---|
| 2,618,447 | 11/1952 | Le Carnie | 244—83 |
| 3,028,126 | 4/1962 | Holleman | 244—83 |
| 3,256,949 | 6/1966 | Petersen | 180—6.66 |
| 3,306,132 | 2/1967 | Davis | 74—721 |

KENNETH H. BETTS, *Primary Examiner.*

L. DANIEL MORRIS, JR., *Assistant Examiner.*

U.S. Cl. X.R.

74—721